US00RE41528E

(19) United States
(12) Reissued Patent
Ho

(10) Patent Number: US RE41,528 E
(45) Date of Reissued Patent: Aug. 17, 2010

(54) ADAPTIVE BRAKE FORCE SETTING SYSTEM IN AN OPTICAL RECORDING DEVICE

(75) Inventor: Hsu-Feng Ho, Hsin-Chu (TW)

(73) Assignee: MediaTek, Inc., Hsin-Chu (TW)

(21) Appl. No.: 11/727,874

(22) Filed: Mar. 28, 2007

Related U.S. Patent Documents

Reissue of:
(64) Patent No.: 6,873,578
Issued: Mar. 29, 2005
Appl. No.: 10/261,503
Filed: Oct. 2, 2002

(30) Foreign Application Priority Data

Aug. 15, 2002 (TW) ..... 91118374 A

(51) Int. Cl.
*G11B 21/08* (2006.01)

(52) U.S. Cl. ..... 369/30.17; 369/30.16
(58) Field of Classification Search ..... 369/30.1–30.17
See application file for complete search history.

(56) References Cited

U.S. PATENT DOCUMENTS 4,926,405 A * 5/1990 Hangai et al. ..... 369/30.16
5,046,058 A 9/1991 Shimonou
5,050,146 A 9/1991 Richgels et al.
5,228,019 A 7/1993 Yanagi
5,398,221 A * 3/1995 Ogawa ..... 369/30.15
5,465,183 A 11/1995 Hattori
5,566,141 A * 10/1996 Yamaguchi et al. ..... 369/30.17
5,566,148 A * 10/1996 Takahara et al. ..... 369/30.16
5,623,464 A 4/1997 Tani
5,699,332 A * 12/1997 Nakano ..... 369/30.16
5,715,157 A 2/1998 Kuhn
6,157,599 A 12/2000 Yamashita et al.
6,721,239 B2 * 4/2004 Kishimoto et al. ..... 369/30.17
6,859,422 B2 * 2/2005 Sheu et al. ..... 369/30.17

* cited by examiner

*Primary Examiner*—Tan X Dinh
(74) *Attorney, Agent, or Firm*—Patterson & Sheridan, LLP

(57) ABSTRACT

The invention provides an adaptive brake force setting system. Every time when a pickup head with a predetermined mass crosses a plurality of recording tracks in an optical recording media, the system is used for selling brake force to make the pickup head stop from a predetermined initial brake position to a target recording track. The system comprises a detecting module and an estimating module. The detecting module is for detecting a final velocity and an acceleration of the pickup head when the pickup head arrives at the initial brake position. The estimating module is for, according to the final velocity and the acceleration, using a predetermined brake force estimating process to estimate the brake force exerted on the pickup head at each time for making the pickup head stop to the target recording track in a predetermined braking time. Therefore, the pickup head stop exactly to the target-recording track.

29 Claims, 3 Drawing Sheets

ADAPTIVE BRAKE FORCE SETTING SYSTEM IN AN OPTICAL RECORDING DEVICE

Matter enclosed in heavy brackets [ ] appears in the original patent but forms no part of this reissue specification; matter printed in italics indicates the additions made by reissue.

FIELD OF THE INVENTION

This invention relates to an adaptive brake force setting system; in particular, an adaptive brake force setting system used in a pickup head.

BACKGROUND OF THE INVENTION

Please refer to FIG. 1. FIG. 1 is a schematic diagram of an optical recording system 10 according to the prior art. The optical recording system 10 comprises a pickup head 12 and an optical recording media 14. The optical recording media 14 comprises a spiral recording track 16, a series of indents. The pickup head 12 reads data on the track 16 by locking onto the track 16 of the optical recording media 14.

The pickup head 12 has to read the data in different positions on the optical recording media 14. Because the pickup head 12 can only move in a radial direction on the optical recording media 14, the pickup head 12 can not move directly from position A to position C. Therefore, the pickup head 12 has to move from position A to position B and then from position B to position C to lock onto the track 16 again and reads the data on position C.

Though, the optical recording media 14 has only one spiral-recording track 16. When the pickup head 12 moves from position A to position B, the pickup head 12 seems to across a number of recording tracks. The movement form position A to position B is called seek or seeking. After seeking, the pickup head 12 has to move from position B to position C to lock onto a target track again and then reads data on the target track. The movement from position B to position C is called following.

After seeking, the optical recording system 10 exerts brake force to make the pickup head 12 stop before switching to the following. When the pickup head 12 is seeking, the pickup head 12 is going to stop slowly, but the velocity of the pickup head 12 is still fast and the momentum of the pickup head 12 is still strong. It is difficult for the pickup head 12 to lock onto the next target track immediately. Therefore, the optical recording system 10 has to exert brake force on the pickup head 12 for making the pickup head 12 stop before switching to the following.

After seeking and before switching to the following, the optical recording system 10 exerts brake force to make the pickup head 12 stop. Before the pickup head 12 finishes seeking, an estimating mechanism of control IC of the pickup head 12 informs the pickup head 12 that how far the target-recording track is. The optical recording system 10 exerts brake force when the last (or the last half of) track arrives. The prior art used a fixed brake force. It cannot smoothly decrease the velocity of the pickup head under many circumstances.

The optical recording system 10 breaks the pickup head with the fixed brake force. If the final velocity of the pickup head 12 is fast, the optical recording system 10 spends a long time to brake the pickup head 12 and the pickup head 12 will exceed the target recording track. If the final velocity of the pickup head 12 is slow, the optical recording system 10 spends a short time to brake the pickup head 12 and the pickup head 12 will not arrive at the target recording track. Therefore, the optical recording system 10 has to make the pickup head 12 lock onto the target recording track by following.

SUMMARY OF THE INVENTION

The objective of the present invention is to provide an adaptive brake force setting system for improving the shortcomings of the prior art.

The present invention relates to an adaptive brake force setting system. Every time when a pickup head with a predetermined mass crosses a plurality of recording tracks in an optical recording media, the adaptive brake force setting system can set brake force to make the pickup head stop from a predetermined initial brake position to a target recording track.

The adaptive brake force setting system of the present invention comprises a detecting module and an estimating module. The detecting module is for detecting a final velocity and an acceleration of the pickup head when the pickup head arriving the initial brake position. The estimating module, according to the final velocity and the acceleration, uses a predetermined brake force estimating process to estimate the brake force exerted on the pickup head at each time for making the pickup head stop on the target recording track in a predetermined braking time.

The pickup head receives a base force when crossing the plurality of recording tracks. The brake force estimating process estimates the brake force according to the base force, the final velocity, the acceleration, the mass of pickup head and the braking time.

The present invention auto-adjusts the brake force exerted on the pickup head according to the final velocity and acceleration of the pickup head before finishing seeking. Therefore, the pickup head can arrive on the target recording track in the predetermined braking time.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
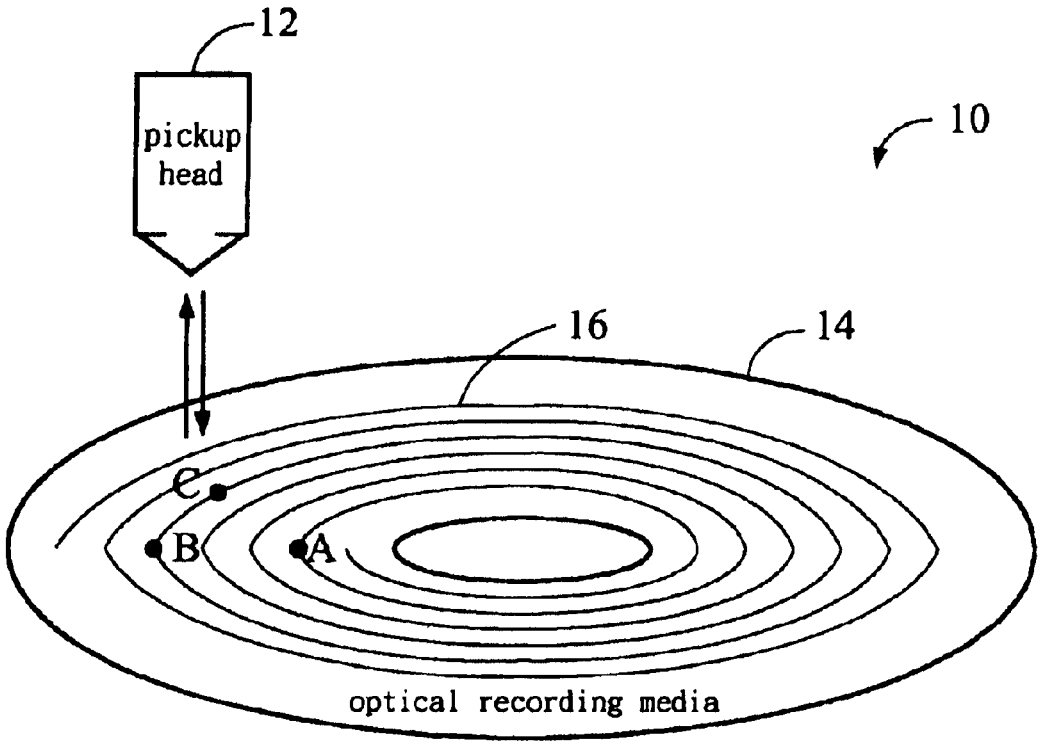
FIG 1 prior art
FIG. 1 is a schematic diagram of an optical recording system according to the prior art.
Figure 2:
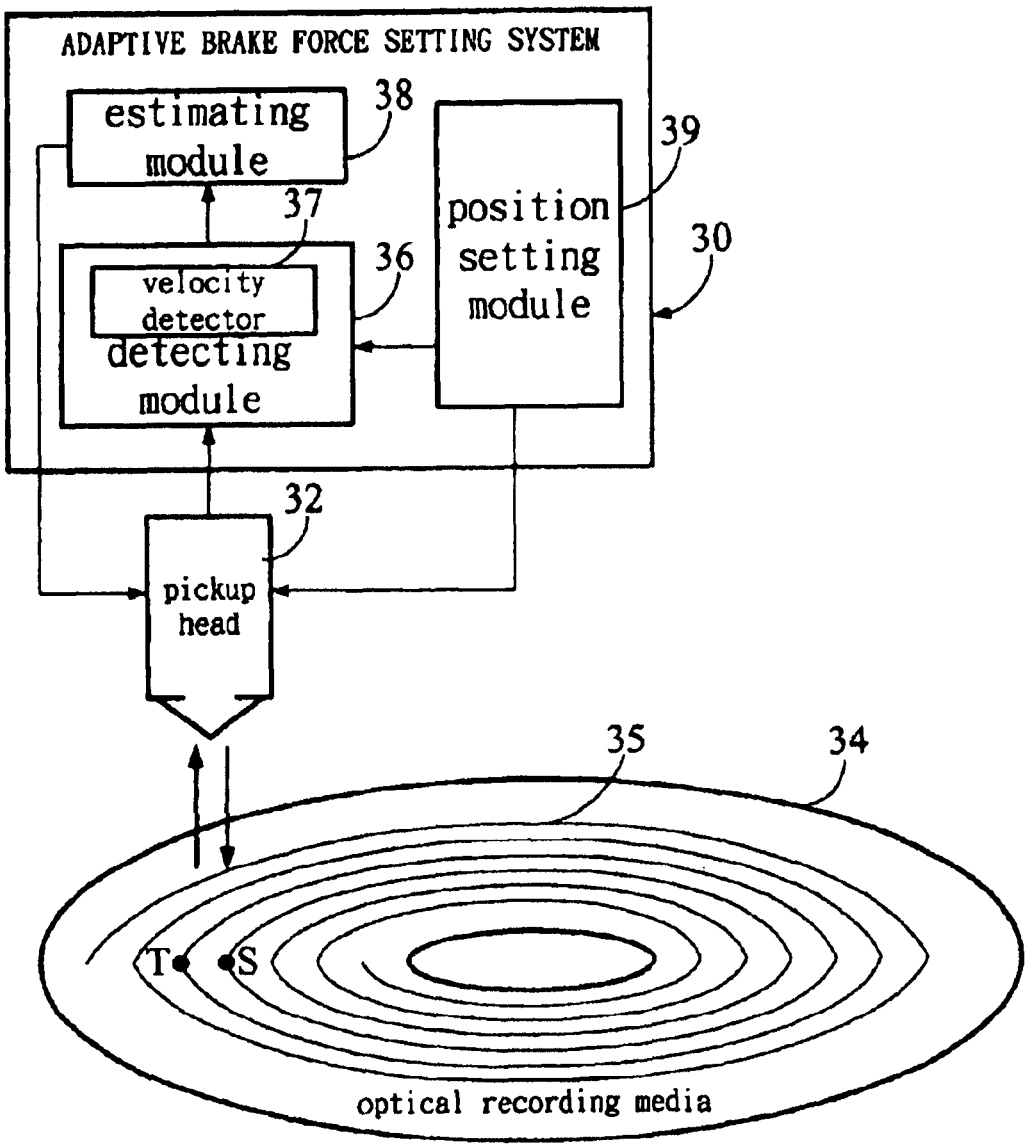
FIG. 2 is a schematic diagram of an adaptive brake force setting system and an optical recording media according to the present invention.

Please refer to FIG. 2. FIG. 2 is a schematic diagram of an adaptive brake force setting system 30 and an optical recording media 34 according to the present invention. The present invention relates to an adaptive brake force setting system 30. Every time when a pickup head 32 with a predetermined mass crosses a plurality of recording tracks 35 in an optical recording media 34 (when seeking), the adaptive brake force setting system 30 is used for setting brake force to make the pickup head 32 stop from a predetermined initial brake position S to a target recording track T. As mentioned in the background of the invention, the optical recording media 34 has only one spiral-recording track. The plurality of recording tracks 35 described here is that when the pickup head 32 is seeking, it seems to across a number of recording tracks to the target-recording track T.

As shown in FIG. 2, the adaptive brake force setting system 30 of the present invention comprises a detecting module 36, an estimating module 38 and a position-setting module 39. The detecting module 36is for detecting a final velocity and an acceleration of the pickup head 32 when the pickup head 32 arriving the initial brake position S. The estimating module 38, according to the final velocity and the acceleration which is detected by detecting module 36, uses a predetermined brake force estimating process to estimate the brake force exerted on the pickup head 32 at each time for making the pickup head 32 stop to the target recording track T at in a predetermined braking time. The position-setting module 39 is for setting the predetermined initial brake position S of the pickup head 32. For example, the initial brake position S can set on one track or half track before the target recording track T.

As shown in FIG. 2, the detecting module 36 comprises a velocity detector 37 for detecting the variation of velocity of the pickup head 32 crossing the plurality of recording tracks, and then obtaining the final velocity and the acceleration of the pickup head 32 when the pickup head 32 arrives the initial brake position S.

What follows is the brake force estimating process of the present invention. The brake force estimating process of the present invention is deducted from the momentum conservation law for that the momentum of the objects is fixed:

$$\text{Momentum}=F\times\Delta t=m\times V;$$

wherein, F is the brake force, Δt is the braking time, m is the mass of the pickup head 32 and V is the final velocity of the pickup head 32.

When the mass of the pickup head 32 is fixed, the faster the final velocity the greater the momentum, and a greater reverse momentum is needed to stop the pickup head 32. Therefore, if the brake force for stopping the pickup head 32 is fixed, the pickup head 32 spends more time to brake. If the braking time is fixed, the brake force is proportional to the final velocity of pickup head 32. Because the next step of the seeking is the following, the present invention uses unfixed brake force but fixed braking time to avoid spending a long time in braking and the pickup head 32 stopping outsides the target recording track during the following.

The momentum of the pickup head 32 is suffered from the brake force and other factors such as friction. The other factors are generally called a base brake force. The base brake force relates to the type of the pickup head 32. Therefore, in the present invention, the base brake force, as well as the mass of the pickup head 32, is known. Therefore, the equation of momentum in the present invention can be modified as follows:

$$\text{Momentum}=m\times V=(\text{brake force}+\text{base brake force})\times\Delta t$$

In conclusion, the brake force estimating process estimates the brake force exerted on the pickup head 32 according to the base brake force, final velocity, acceleration, mass and braking time of the pickup head 32. The momentum equation can be deduced to a simple equation for estimating brake force as follows:

$$\text{brake force}=\text{base brake force}+m\times V/\Delta t.$$

This equation framework is not perfect for that it ignores the influence of the acceleration. The preferred embodiment of the present invention gives a complete brake force equation. First of all, set a least final velocity. When the final velocity of pickup head 32 is less than the least final velocity, the system brakes the pickup head 32 by the minimum brake force. Therefore, the pickup head 32 does not stop too quickly because the brake force is not so big. The estimating brake force equation according to the preferred embodiment of the present invention is as follows:

$$\text{brake force}=\text{base brake force}+\text{parameter }\mathbf{1}\times\text{acceleration}+\text{parameter }\mathbf{2}\times(\text{final velocity}-\text{the smallest final velocity});$$

wherein parameter 1 and parameter 2 are based on the mass and braking time of the pickup head 32 to adjust a gain value. This is to convert the final velocity and the acceleration into a gain value of a force. When the pickup head 32 is applied in the optical recording system, the parameter 1 and parameter 2 are predetermined. When the pickup head 32 finishes seeking, the adaptive brake force setting system of the present invention detects the final velocity and the acceleration to estimate the brake force exerted on the pickup head 32.

Figure 3:
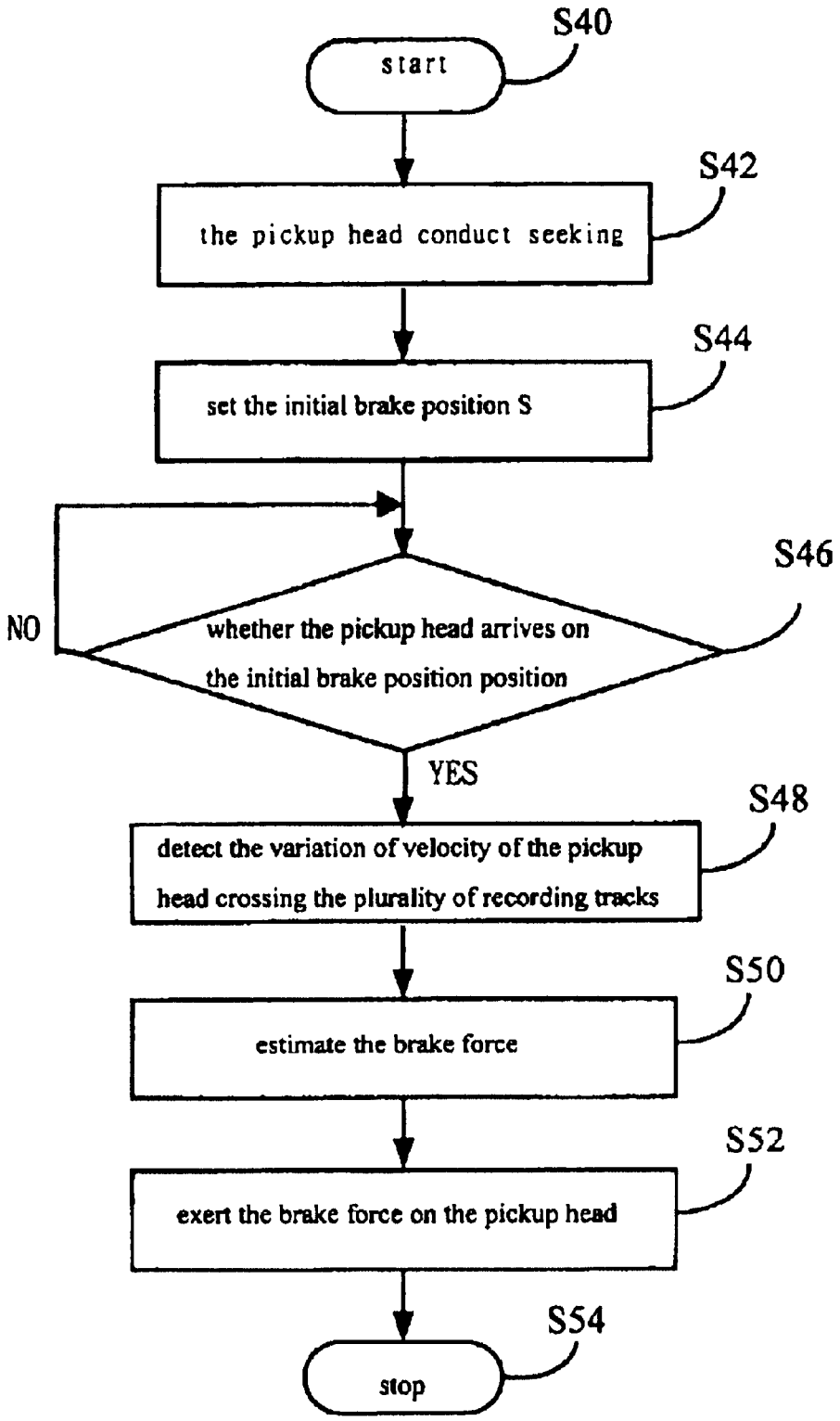
FIG. 3 is a flowchart of a method of setting the adaptive brake force according to the present invention.

Please refer to FIG. 3. FIG. 3 is a flowchart of a method of setting the adaptive brake force according to the present invention. The method comprises the following steps:

Step S40: start;

Step S42: the pickup head 32 conduct seeking;

Step S44: set the initial brake position S;

Step S46: determine whether the pickup head arrives on the initial brake position; if yes, go to step S48; if no, go back to S46;

Step S48: detect the variation of velocity of the pickup head 32 crossing the plurality of recording tracks, and then obtain the final velocity and the acceleration of the pickup head 32;

Step S50: estimate the brake force;

Step S52: exert the brake force on the pickup head 32;

Step S54: stop.

The present invention auto-adjusts the brake force exerted on the pickup head 32 according to the final velocity and the acceleration of pickup head 32 before finishing seeking. Therefore, the pickup head 32 can arrive on the target recording track T in the predetermined braking time. It prevents the pickup head 32 from exceeding the target-recording track T and stopping too early.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An adaptive brake force setting system, when a pickup head with a predetermined mass crosses a plurality of recording tracks in an optical recording media, used for setting brake force to make the pickup head stop from a predetermined initial brake position to a target recording track, the system comprising:

a detecting module for detecting a final velocity and an acceleration of the pickup head when the pickup head arrives at the initial brake position; and an estimating module, according to the final velocity and the acceleration, using a predetermined brake force estimating process to estimate the brake force exerted on the pickup head for making the pickup head stop to the target recording track in a predetermined braking time.

2. The system of claim 1, further comprising a position setting module for setting the predetermined initial brake position of the pickup head.

3. The system of claim 2, wherein the predetermined initial brake position is one track before the target-recording track.

4. The system of claim 2, wherein the predetermined initial brake position is half of the track before the target-recording track.

5. The system of claim 1, wherein the detecting module comprises a velocity detector for detecting the variation of velocity of the pickup head crossing the plurality of recording tracks, and then obtaining the final velocity and the acceleration of the pickup head.

6. The system of claim 1, wherein the pickup head receives a base force when crossing the plurality of recording tracks, and the brake force estimating process estimates the brake force according to the basic force, the final velocity, the acceleration, the mass of the pickup head and the predetermined braking time.

7. An adaptive brake force setting method, when a pickup head with a predetermined mass crosses a plurality of recording tracks in an optical recording media, used for setting brake force to make the pickup head stop from a predetermined initial brake position to a target recording track, the method comprising:

detecting a final velocity and an acceleration of the pickup head when the pickup head arrives at the initial brake position;

according to the final velocity and the acceleration, using a predetermined brake force estimating process to estimate the brake force exerted on the pickup head for making the pickup head stop to the target recording track in a predetermined braking time.

8. The method of claim 7, further comprising a step of:

setting the predetermined initial brake position of the pickup head.

9. The method of claim 8, wherein the predetermined initial brake position is one track before the target-recording track.

10. The method of claim 8, wherein the predetermining predetermined initial brake position is half of the track before the target-recording track.

11. The method of claim 7, wherein the detecting process is for detecting the variation of velocity of the pickup head crossing the plurality of recording tracks, and then obtaining the final velocity and the acceleration of the pickup head.

12. The method of claim 7, wherein the pickup head receives a base *brake* force when crossing the plurality of recording tracks, and the brake force estimating process estimates the brake force according to the [basic] *base brake* force, the final velocity, the acceleration, the mass of the pickup head and the predetermined braking time.

*13. An adaptive brake force setting system, when a pickup head with a predetermined mass crosses a plurality of recording tracks in an optical recording media, used for setting brake force to make the pickup head stop from a predetermined initial brake position to a target recording track, the system comprising: a detecting module for detecting a final velocity of the pickup head when the pickup head arrives at the initial brake position; and an estimating module, according to the final velocity, using a predetermined brake force estimating process to estimate the brake force exerted on the pickup head for making the pickup head stop to the target recording track in a predetermined braking time; wherein the detecting module further detects an acceleration of the pickup head and wherein the pickup head receives a base brake force when crossing the plurality of recording tracks, and the brake force estimating process estimates the brake force according to the base brake force, the final velocity, the acceleration, the mass of the pickup head and the predetermined braking time.*

*14. The system of claim 13, further comprising a position setting module for setting the predetermined initial brake position of the pickup head.*

*15. The system of claim 14, wherein the predetermined initial brake position is one track before the target-recording track.*

*16. The system of claim 14, wherein the predetermined initial brake position is half of the track before the target-recording track.*

*17. The system of claim 13, wherein the detecting module comprises a velocity detector for detecting the variation of velocity of the pickup head crossing the plurality of recording tracks, and then obtaining the final velocity and an acceleration of the pickup head.*

*18. An adaptive brake force setting method, when a pickup head with a predetermined mass crosses a plurality of recording tracks in an optical recording media, used for setting brake force to make the pickup head stop from a predetermined initial brake position to a target recording track, the method comprising: detecting a final velocity of the pickup head when the pickup head arrives at the initial brake position; according to the final velocity, using a predetermined brake force estimating process to estimate the brake force exerted on the pickup head for making the pickup head stop to the target recording track in a predetermined braking time; wherein the detecting process is for detecting the variation of velocity of the pickup head crossing the plurality of recording tracks, and then obtaining the final velocity and an acceleration of the pickup head; and wherein the pickup head receives a base brake force when crossing the plurality of recording tracks, and the brake force estimating process estimates the brake force according to the base brake force, the final velocity, the acceleration, the mass of the pickup head and the predetermined braking time.*

*19. The method of claim 18, further comprising a step of: setting the predetermined initial brake position of the pickup head.*

*20. The method of claim 19, wherein the predetermined initial brake position is one track before the target-recording track.*

*21. The method of claim 19, wherein the predetermined initial brake position is half of the track before the target-recording track.*

*22. An adaptive brake force setting system, when a pickup head with a predetermined mass crosses a plurality of recording tracks in an optical recording media, used for setting brake force to make the pickup head stop from a predetermined initial brake position to a target recording track, the system comprising: a detecting module for detecting an acceleration of the pickup head when the pickup head arrives at the initial brake position; and an estimating module, according to the acceleration, using a predetermined brake force estimating process to estimate the brake force exerted on the pickup head for making the pickup head stop to the target recording track in a predetermined braking time; wherein the pickup head receives a base brake force when crossing the plurality of recording tracks, and the brake force estimating process estimates the brake force*

*according to the base brake force, the acceleration, the mass of the pickup head and the predetermined braking time.*

*23. The system of claim 22, further comprising a position setting module for setting the predetermined initial brake position of the pickup head.*

*24. The system of claim 23, wherein the predetermined initial brake position is one track before the target-recording track.*

*25. The system of claim 23, wherein the predetermined initial brake position is half of the track before the target-recording track.*

*26. An adaptive brake force setting method, when a pickup head with a predetermined mass crosses a plurality of recording tracks in an optical recording media, used for setting brake force to make the pickup head stop from a predetermined initial brake position to a target recording track, the method comprising: detecting an acceleration of the pickup head when the pickup head arrives at the initial brake position; according to the acceleration, using a predetermined brake force estimating process to estimate the brake force exerted on the pickup head for making the pickup head stop to the target recording track in a predetermined braking time; wherein the pickup head receives a base brake force when crossing the plurality of recording tracks, and the brake force estimating process estimates the brake force according to the base brake force, the acceleration, the mass of the pickup head and the predetermined braking time.*

*27. The method of claim 26, further comprising a step of: setting the predetermined initial brake position of the pickup head.*

*28. The method of claim 27, wherein the predetermined initial brake position is one track before the target-recording track.*

*29. The method of claim 27, wherein the predetermined initial brake position is half of the track before the target-recording track.*

* * * * *